Patented Oct. 28, 1952

2,615,899

UNITED STATES PATENT OFFICE 2,615,899

CATALYST AND PROCESS FOR ETHYLENE OXIDE MANUFACTURE

George W. Sears, Jr., Wilmington, Del., assignor to E. I. du Pont de Nemours & Company, Wilmington, Del., a corporation of Delaware No Drawing. Application June 23, 1949, Serial No. 100,982

2 Claims. (Cl. 260—348.5)

This invention relates to catalyst compositions adapted for fluid-flow catalytic operations. More particularly it relates to catalyst compositions, useful in fluid-flow catalytic processes for the oxidation of ethylene to ethylene oxide, containing artificial graphite as a diluent and a silver-containing catalyst as an active catalytic material.

The expresison "fluid-flow catalytic operations" is used herein to designate those vapor-phase reaction processes in which the reaction is effected in the presence of a solid catalyst composition which is suspended and agitated in a stream of the reacting vapors. In many such fluid-flow catalytic operations and particularly those in which one or more of the essential catalytic ingredients of the catalyst composition is a metal, there is a tendency for the catalytic particles to cohere and to form agglomerates.

The cohesion and agglomeration of catalytic particles is particularly troublesome in fluid-flow catalytic operations in which metallic silver is an active catalytic material, such as in processes for the oxidation of ethylene to ethylene oxide. The seriousness of the problem varies with the method of preparation of the particular silver-containing catalyst. Unhappily the problem is most acute with some of the more active silver catalysts.

The term "catalyst composition" is used herein to designate the total solid mixture with which gaseous reactants are contacted to effect a catalytic reaction. Thus the term includes not only the active silver-containing component, or silver catalyst, but also all other materials in the solid mixture such as carriers, supports, diluents, promoters and conditioning agents. The term includes such solid mixture in a suitable degree of subdivision for suspension in a stream of reacting gases.

"Silver catalyst" or "silver-containing catalyst" as used herein means the silver containing particles of the catalyst composition as distinguished from discrete particles of carrier and other materials which constitute part of the catalyst composition.

The shortcomings of catalyst compositions containing a silver catalyst for use in fluid-flow processes for the oxidation of ethylene are not overcome by dispersing the silver catalyst on a supporting carrier or by mixing it with the conventional diluents in accordance with prior art practices. If the silver catalyst is dispersed on a supporting carrier, the catalyst composition does not long stay "fluid" in the fluid-flow catalytic operation; the mass soon ceases to "boil" or be suspended in the gas stream and becomes a fixed, spongy bed thru which the vapors channel. If on the other hand the active silver catalyst is not carried on a support but is merely mixed with a conventional solid diluent, then silver particles tend to coalesce, settle, and fuse into a mass in the catalyst chamber, or sometimes they form a rough silver coating on the walls of the chamber.

I have found that the foregoing and other similar unsatisfactory behavior of catalyst compositions in fluid-flow catalytic operations is overcome by including in the catalyst composition a substantial amount of artificial graphite. Artificial graphite is the term commonly given to the product obtained by means of the conventional electric furnace processes in which such materials as anthracite, coke, or carbides are heated at about 2200° C. or higher.

The action of artificial graphite is surprising since it not only fails to have a deleterious effect on the catalyst activity but, on the contrary, its presence lengthens the life of the catalyst and provides a highly-mobile, easily-suspended, catalyst composition completely freed of the tendency to cohere or agglomerate; the catalyst composition can be maintained in a fluid state indefinitely. Natural graphite, however, in any of its forms, flake, amorphous, or crystalline, is unsatisfactory.

The silver catalyst for use in the catalyst compositions of the invention may be prepared in any of the manners previously employed for the preparation of silver catalyst such as by the thermal or chemical reduction of silver compounds such as silver oxides, silver carbonate, or suitable organic silver compounds. The activity of the silver may be enhanced by inclusion in the silver catalyst of promoters such as iron, nickel, copper, gold, platinum, manganese, cobalt, cerium, thorium, zinc, and the oxides, hydroxides, and carbonates of the alkali metals and alkaline earth metals.

In accordance with the usual practices the silver catalyst may also be admixed with a carrier which serves as a diluent or as a support for the silver catalyst. Typical of the materials suggested in the art as carriers, supports, or diluents are materials such as firebrick, alumina, corundum, Alundum, zeolites and the like.

As mentioned previously the artificial graphite is present in substantial amounts in the catalyst compositions of the invention. The minimum amount required to get the desired results will, of course, vary with the particular active catalytic materials used, the method of preparation of the catalyst composition and its properties, and the operating conditions of the catalytic fluid-flow operation. In general amounts less than about 10% are of little value, unless finely powdered artificial graphite, say about 325 mesh, is employed in which case amounts as low as about 1.5% by volume impart substantial fluidizing properties. To realize the full benefit of artificial graphite in catalyst compositions using a silver catalyst, it is preferred, however, that the artificial graphite be present in amount corresponding to at least 25% by volume of the total catalyst composition. As a practical matter, it should not exceed about 75% by volume.

The particle size of artificial graphite used may be varied widely depending upon the operating conditions of the process such as the linear velocity of the gas flow in the reaction vessel, the gas composition and its density, the pressure and so forth. Powdered artificial graphite, say 325 mesh, may be used in some operations although it tends to be carried along with the gas stream and thus adds a recovery problem. Preferably the artificial graphite used is granular and has an average particle size in the range of 50 to 200 mesh.

The catalyst compositions of the invention are employed in the fluid-flow catalytic processes by suspending a catalyst composition containing an active catalytic material and artificial graphite in a stream of gaseous reactants at a reactive temperature, that is, at a temperature which is suitable for effecting the particular catalytic reaction. Fluid-flow catalytic processes for making ethylene oxide are preferably carried out according to the invention by suspending a catalyst composition containing a silver catalyst and granular artificial graphite, the artificial graphite comprising from about 25 to 75% of the volume of the catalyst composition in a stream of ethylene and an oxygen-containing gas at a temperature of 150° C. to 400° C.

In order that the invention may be better understood, reference should be had to the following illustrative examples.

Example I 156 parts by weight of silver nitrate and 1.5 parts by weight of samarium nitrate hexahydrate (Ag:Sm weight ratio=99:0.5) are dissolved in 1500 parts by weight of water. While stirring the solution, 400 parts by weight of a 10% aqueous solution of sodium hydroxide is added to precipitate the silver and samarium as their oxides or hydroxides. The precipitate is washed with water until substantially nitrate-free.

The precipitate is slurried in water with a volume of firebrick (50–200 mesh) sufficient to give on drying 750 grams of silver per liter of solids. The water is then evaporated off while stirring the slurry and the solids are finally dried at about 110° C. This gives a coated firebrick which is then treated with a stream of 2% ethylene in nitrogen at 175° C. to reduce the silver compound to metallic silver and the samarium compound to samarium oxide.

One volume of the reduced silver-samarium-firebrick mixture is then dry mixed with one volume of uncoated firebrick and one volume of artificial graphite (thru 50 and on 200 mesh size) to give a catalyst composition containing about 33⅓% by volume of artificial graphite and approximately 250 grams of silver per liter of finished catalyst composition.

The catalyst composition of Example I remains ideally fluid as a so-called boiling bed in a fluid-flow catalytic process for the oxidation of ethylene to ethylene oxide in which a stream of 10% ethylene in air is passed thru the catalyst composition at a linear gas velocity of 0.5 ft. per second and a temperature of 250° C.

Example II

Silver and iron in an Ag:Fe weight ratio of 99:1 are precipitated by addition of a solution of sodium hydroxide to an aqueous solution of the nitrates of silver and iron. The precipitate is washed free of nitrate and then dried at about 110° C.

The dried precipitate is slurried in acetone with a volume of calcined diatomaceous earth (50–200 mesh) sufficient to give on drying 430 grams of silver per liter of solids. The mixture in acetone is stirred until it is dry enough to be free-flowing; then the remainder of the acetone is removed by heating at about 75° C. without stirring. There is thus obtained a coated calcined diatomaceous earth. This material is then spread in a thin layer and heated at 350° C. in air for about an hour to reduce the silver and iron compounds in the coating.

Three volumes of the reduced silver-iron oxide-calcined diatomaceous earth mixture is dry mixed with one volume of 50–200 mesh artificial graphite to give a catalyst composition containing approximately 25% by volume of artificial graphite and 320 grams of silver per liter of total composition.

The catalyst composition of Example II has excellent fluidizing properties in a fluid-flow catalytic process for the oxidation of ethylene to ethylene oxide in which a feed of 25% ethylene in air is passed thru the catalyst composition at a linear gas velocity of 0.3 ft. per second and a temperature of about 250° C.

Example III

One part by weight of lanthanum as its nitrate and 99 parts by weight of silver as silver nitrate are dissolved in 1500 parts by weight of water. 40 parts by weight of sodium hydroxide in 360 parts by weight of water is added to this solution with stirring to precipitate the silver and lanthanum as their oxides or hydroxides. The precipitate is washed until nitrate free and then dried at 110° C.

The dried precipitate is slurried in acetone with granular Alundum (50–200 mesh) in amount sufficient to give on a dry basis 1070 grams of silver per liter of dry solids. The mixture in acetone is stirred until it is dry enough to be free-flowing and then the remainder of the acetone is removed by heating with stirring at about 75° C., thus giving a coated Alundum.

The coated Alundum is reduced at 175° C. by contacting it with a stream of 2% ethylene in nitrogen. After the reduction step, one volume of the coated Alundum is mixed with two volumes of uncoated Alundum and 1/20 of a volume of powdered artificial graphite (about 325 mesh) and there is thus obtained a catalyst composition containing about 1.6% by volume powdered artificial graphite and approximately 350 grams of silver per liter of catalyst composition.

The composition of this example is easily suspended and fluidized at a temperature of 250° C. in a stream of 10% ethylene in air at a linear gas velocity of 0.5 ft. per second and is effective at those conditions for giving a high conversion of ethylene to ethylene oxide. However, because of the fineness of the powdered graphite with respect to the remainder of the catalyst composition, the powdered graphite tends to become separated from the rest of the composition and be carried along by the gas stream. Therefore, in order to retain satisfactory fluidity using such powdered graphite, the graphite is recovered from the gas stream and recycled to the catalyst mass.

The composition of this example represents about the minimum amount of artificial graphite which can be used to impart substantial fluidizing properties. More preferably, as pointed out elsewhere, the artificial graphite employed is granular in form, that is, in the order of 50 to 200 mesh and constitutes from about 25% to 75% of the volume of the total catalyst composition.

*Example IV*

Silver oxide is precipitated with ferric hydroxide in an Ag:Fe weight ratio of 99:1 and dried following the procedure of Example II. The dried precipitate is slurried in acetone with calcined diatomaceous earth (50 to 200 mesh) in amount sufficient to give 1600 grams of silver per liter of solids on a dry basis. The slurry is stirred while permitting the acetone to evaporate until the stirred mixture is dry enough to be free-flowing and then the remainder of the acetone is removed by heating without stirring at about 75° C. The dried coated calcined diatomaceous earth is treated with 2% ethylene in nitrogen at 175° C. to give a metallic silver-ferric oxide coated calcined diatomaceous earth.

One volume of the reduced product is mixed with 3 volumes of granular artificial graphite (thru 50 and on 200 mesh material) to give a finished catalyst composition containing 75% by volume of artificial graphite and 400 grams of silver per liter of catalyst composition.

The composition of Example IV is well suited for use in the oxidation of ethylene to ethylene oxide in a fluid-flow operation employing as feed 10% ethylene in air at a linear gas velocity in the reactor of 0.3 ft. per second and a temperature of about 250° C.

I claim:
1. A catalyst composition adapted for fluid-flow catalytic operations for the oxidation of ethylene to ethylene oxide consisting essentially a silver catalyst and, as a diluent, granular artificial graphite, the artificial graphite comprising from about 25 to 75% of the volume of the catalyst composition.

2. A fluid-flow catalytic process for making ethylene oxide which comprises suspending the catalyst composition consisting essentially a silver catalyst and, as a diluent, granular artificial graphite, the artificial graphite comprising from about 25 to 75% of the volume of the catalyst composition, in a stream of ethylene and oxygen-containing gas at a temperature of 150° C. to 400° C.

GEORGE W. SEARS, Jr.

REFERENCES CITED

The following references are of record in the file of this patent:

UNITED STATES PATENTS

| Number | Name | Date |
|---|---|---|
| 1,151,003 | Ellis | Aug. 24, 1915 |
| 2,040,782 | Van Peski | May 12, 1936 |
| 2,393,240 | Dreyfus | Jan. 22, 1946 |
| 2,424,083 | Finch | July 15, 1947 |
| 2,424,084 | Finch | July 15, 1947 |
| 2,430,443 | Becker | Nov. 1, 1947 |
| 2,437,930 | Berginsteinsson | Mar. 16, 1948 |
| 2,481,824 | Claussen et al. | Sept. 18, 1949 |
| 2,502,678 | Spaulding et al. | Apr. 4, 1950 |
| 2,517,223 | Mantell | Aug. 1, 1950 |

OTHER REFERENCES

Berkman—"Catalysis," pp. 696–697, Reinhold Pub. Co., N. Y. (1940).

Mantell "Industrial Carbon," page 216, 1946.